US012594930B2

(12) United States Patent
Song

(10) Patent No.: US 12,594,930 B2
(45) Date of Patent: Apr. 7, 2026

(54) TRAILER ANTI-SWAY SYSTEM

(71) Applicant: HYUNDAI MOBIS CO., LTD., Seoul (KR)

(72) Inventor: Dong Ho Song, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 2 days.

(21) Appl. No.: 18/617,714

(22) Filed: Mar. 27, 2024

(65) Prior Publication Data

US 2024/0391452 A1    Nov. 28, 2024

(30) Foreign Application Priority Data

May 25, 2023    (KR) .......................... 10-2023-0067482

(51) Int. Cl.
   *B60W 30/02*    (2012.01)
   *B60D 1/30*    (2006.01)
   (Continued)
(52) U.S. Cl.
   CPC .............. *B60W 30/02* (2013.01); *B60D 1/30* (2013.01); *B60W 10/18* (2013.01); *B60W 10/20* (2013.01);
   (Continued)
(58) Field of Classification Search
   CPC ...... B60W 30/02; B60W 10/18; B60W 10/20; B60W 10/22; B60W 50/0097;
   (Continued)

(56) References Cited

U.S. PATENT DOCUMENTS 8,326,504 B2 * 12/2012 Wu ........................... B60D 1/58
                                                    303/189
10,259,390 B2 * 4/2019 Zhang ........................ G06T 7/73
                        (Continued)

FOREIGN PATENT DOCUMENTS

EP        2 045 155 A1    4/2009

OTHER PUBLICATIONS

Wu, Bingxing; CMOS Image Sensors and Algorithms for Traffic Detections Applications; May 2018; University of Idaho (Year: 2018).*

(Continued)

*Primary Examiner* — Lindsay M Low
*Assistant Examiner* — Susan E Scharpf
(74) *Attorney, Agent, or Firm* — MORGAN, LEWIS & BOCKIUS LLP

(57)        ABSTRACT
Proposed is a trailer anti-sway system including a front camera, a front and side radar, a tow truck IMU, a hinge angle sensor configured to measure a hinge angle between the tow truck and a trailer, a rear camera configured to photograph a rear side of the trailer, a rear and side radar configured to monitor the rear and side of the trailer, a trailer IMU mounted to the trailer, and a controller configured to receive a signal of at least one of the front camera, the front and side radar, the tow truck IMU, the hinge angle sensor, the rear camera, the rear and side radar, the trailer IMU, predict the possibility of the sway occurrence to warn a driver of the possibility of the sway occurrence, and perform stability control for the tow truck and the trailer by stages according to a predetermined reference condition.

9 Claims, 18 Drawing Sheets

(51) Int. Cl.

| | |
|---|---|
| *B60W 10/18* | (2012.01) |
| *B60W 10/20* | (2006.01) |
| *B60W 10/22* | (2006.01) |
| *B60W 50/00* | (2006.01) |
| *B60W 50/14* | (2020.01) |

(52) U.S. Cl.
CPC ........ *B60W 10/22* (2013.01); *B60W 50/0097* (2013.01); *B60W 50/14* (2013.01); *B60W 2420/403* (2013.01); *B60W 2520/14* (2013.01); *B60W 2520/16* (2013.01); *B60W 2520/18* (2013.01); *B60W 2552/10* (2020.02); *B60W 2554/4042* (2020.02); *B60W 2710/18* (2013.01); *B60W 2710/20* (2013.01); *B60W 2710/22* (2013.01); *B60W 2720/106* (2013.01)

(58) Field of Classification Search
CPC ........... B60W 50/14; B60W 2420/403; B60W 2520/14; B60W 2520/16; B60W 2520/18; B60W 2552/10; B60W 2554/4042; B60W 2710/18; B60W 2710/20; B60W 2710/22; B60W 2720/106; B60W 30/18163; B60W 2050/143; B60W 2520/22; B60W 2720/16; B60W 40/11; B60W 40/13; B60W 2040/1323; B60W 2300/14; B60W 2520/10; B60W 2554/4023; B60D 1/30; B60D 1/62; B60D 13/00; B60Y 2200/147; B60Y 2300/02
See application file for complete search history.

(56) References Cited

U.S. PATENT DOCUMENTS

| | | | | |
|---|---|---|---|---|
| 10,384,501 | B2 * | 8/2019 | Rothschild | ........... B60W 10/18 |
| 11,220,255 | B2 * | 1/2022 | Crawford | ............. B60W 10/04 |
| 11,364,885 | B2 * | 6/2022 | Viele | .................... B60T 8/1708 |
| 2007/0260385 | A1 * | 11/2007 | Tandy | .................... B60T 8/248 |
| | | | | 303/140 |
| 2007/0260386 | A1 * | 11/2007 | Tandy | .................. B60T 8/1755 |
| | | | | 280/400 |
| 2008/0255741 | A1 * | 10/2008 | Traechtler | ................ B60T 7/20 |
| | | | | 701/70 |
| 2009/0093928 | A1 * | 4/2009 | Getman | ............... G01S 15/931 |
| | | | | 701/37 |
| 2011/0257860 | A1 * | 10/2011 | Getman | ............... B60T 8/1755 |
| | | | | 701/1 |
| 2017/0334444 | A1 * | 11/2017 | Hawes | ................ B62D 15/025 |
| 2017/0341583 | A1 * | 11/2017 | Zhang | .................... H04N 7/181 |
| 2021/0114424 | A1 * | 4/2021 | Jamison | ................ G01S 13/87 |
| 2022/0332307 | A1 * | 10/2022 | McClain | ................ B60D 1/30 |

OTHER PUBLICATIONS

Extended European Search Report issued in corresponding European Patent Application No. 24164032.5) dated Sep. 24, 2024.
Mattia Zanchetta et al., "Trailer control through vehicle yaw moment control: Theoretical analysis and experimental assessment", retrieved from https://www.sciencedirect.com/science/article/pii/S095741581930114X, Mechatonics 64 (2019) 102282, Nov. 11, 2019.

* cited by examiner

Vehicle height adjustment is
required to ensure traction stability

Vehicle height adjustment is completed.

Automatic height adjustment is completed

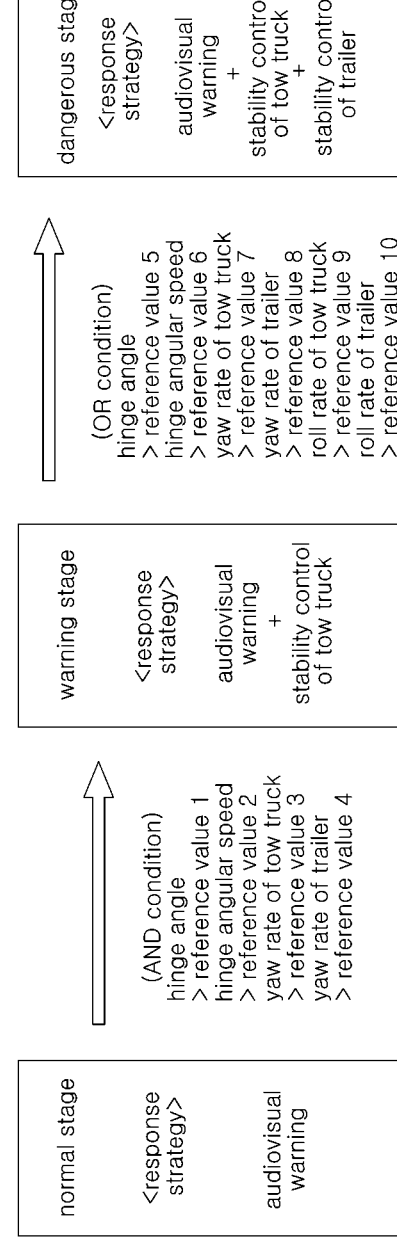

normal stage

\<response strategy\> audiovisual warning (AND condition)
hinge angle
> reference value 1
hinge angular speed
> reference value 2
yaw rate of tow truck
> reference value 3
yaw rate of trailer
> reference value 4 warning stage

\<response strategy\> audiovisual warning
+
stability control of tow truck (OR condition)
hinge angle
> reference value 5
hinge angular speed
> reference value 6
yaw rate of tow truck
> reference value 7
yaw rate of trailer
> reference value 8
roll rate of tow truck
> reference value 9
roll rate of trailer
> reference value 10 dangerous stage

\<response strategy\> audiovisual warning
+
stability control of tow truck
+
stability control of trailer

TRAILER ANTI-SWAY SYSTEM

CROSS REFERENCE TO RELATED APPLICATIONS

The present application claims priority to Korean Patent Application No. 10-2023-0067482, filed May 25, 2023, the entire contents of which is incorporated herein for all purposes by this reference.

BACKGROUND

1. Technical Field

The present disclosure relates to a technology for preventing the sway of a trailer.

2. Description of the Related Art

Sway, a phenomenon which may occur when a tow truck is driving while towing a trailer, is very dangerous and may cause additional accidents which cause a lot of damage.

The causes of the sway may be divided into static and dynamic causes. The static causes include alignment failure due to a weight imbalance between a tow truck and a trailer and insufficient air pressure of tires of a tow truck or a trailer. The dynamic causes include rapid changes in air flow that occur as a large vehicle, such as a truck, passes in a lane adjacent to a tow truck and a trailer.

The description provided above as a related art of the present disclosure is just for helping understand the background of the present disclosure and should not be construed as being included in the related art known by those skilled in the art.

Document of Related Art (Patent Document 1) U.S. Pat. No. 10,384,501 B2

SUMMARY

An objective of the present disclosure is to provide a trailer anti-sway system, in which a situation in which the sway of a tow truck and a trailer is expected to occur is predicted, a driver is warned of the situation, and the occurrence of the sway is effectively suppressed so that the driving stability of the tow truck and the trailer can be further improved.

In order to achieve the objectives of the present disclosure, there is provided a trailer anti-sway system including: a front sensor installed on a front of a tow truck relative to the tow truck and a trailer; a tow truck IMU mounted to the tow truck; a hinge angle sensor configured to measure a hinge angle between the tow truck and the trailer; a rear sensor installed on a rear of the trailer relative to the tow truck and the trailer; a trailer IMU mounted to the trailer; and a controller configured to receive a signal of at least one of the front sensor, the tow truck IMU, the hinge angle sensor, the rear sensor, and the trailer IMU, predict a possibility of a sway occurrence to warn a driver of the possibility of the sway occurrence, and perform stability control for the tow truck and the trailer by stages according to a predetermined reference condition.

In states in which the trailer is not connected to and is connected to the tow truck while the tow truck and the trailer are in stop states, the controller may be configured to use a change of vanishing points of images captured by a front camera to detect a pitch change of the tow truck and, when the pitch change of the tow truck exceeds a predetermined threshold and an alignment failure occurs, to warn a driver of the alignment failure so that the driver is induced to adjust a height of the tow truck or so that the height of the tow truck is automatically adjusted.

When expecting a situation in which a large vehicle will pass by the tow truck and the trailer in a lane at a first side of a towing lane, which is a lane in which the tow truck and the trailer are driving, the controller may be configured to predict that there is the possibility of the sway occurrence.

The situation in which the large vehicle will pass in the lane at the first side of the towing lane may include: at least one of a situation in which a speed of the large vehicle driving on a rear side of a first side lane at the first side of the towing lane is faster than speeds of the tow truck and the trailer; a situation in which the large vehicle driving on a rear side of a second side lane at the first side of the towing lane performs a lane change to the first side lane at the first side of the towing lane at a faster speed than speeds of the tow truck and the trailer; a situation in which the tow truck and the trailer perform a lane change to the first side lane at the first side of the towing lane when the large vehicle on the rear side of the second side lane at the first side of the towing lane is driving at a faster speed than speeds of the tow truck and the trailer; and a situation in which the large vehicle driving at a rear side of a third side lane at the first side of the towing lane performs a lane change to the second side lane at the first side of the towing lane at a faster speed than speeds of the tow truck and the trailer, and the tow truck and the trailer perform a lane change to the first side lane at the first side of the towing lane.

When expecting a situation in which a first large vehicle and a second large vehicle respectively will pass by the tow truck and the trailer in lanes at opposite sides of the towing lane, which is a lane in which the tow truck and the trailer are driving, the controller may be configured to predict that there is the possibility of the sway occurrence.

The situation in which the first large vehicle and the second large vehicle respectively will pass in the lanes at the opposite sides of the towing lane may include: at least one of a situation in which speeds of the tow truck and the trailer are faster than speeds of the first large vehicle and the second large vehicle respectively driving side by side at front sides of first side lanes at the opposite sides of the towing lane; a situation in which the first large vehicle, which is driving alongside the tow truck and the trailer, in a second side lane at a first side of the towing lane performs a large change to a first side lane at the first side of the towing lane, and speeds of the tow truck and the trailer are faster than a speed of the second large vehicle driving at a front side of a first side lane at a second side of the towing lane; and a situation in which the tow truck and the trailer perform a lane change to a first side lane at the first side of the towing lane at a faster speed than the speed of the second large vehicle driving at a front side of the towing lane, and the first large vehicle, which is driving alongside the tow truck and the trailer, in a third side lane at the first side of the towing lane performs a lane change to a second side lane at the first side of the towing lane.

When the hinge angle exceeds a predetermined first reference value; a hinge angular speed exceeds a predetermined second reference value; a yaw rate of the tow truck exceeds a predetermined third reference value; and a yaw rate of the trailer exceeds a predetermined fourth reference value, the predetermined reference condition may be preset to meet a condition to enter a warning stage; and when the entrance to the warning stage is performed, the controller may be configured to perform the stability control for only the tow truck.

In the situation in which the condition to enter the warning stage is met, when the hinge angle exceeds a predetermined fifth reference value greater than the first reference value; the hinge angular speed exceeds a predetermined sixth reference value greater than the second reference value; the yaw rate of the tow truck exceeds a predetermined seventh reference value greater than the third reference value; the yaw rate of the trailer exceeds a predetermined eighth reference value greater than the fourth reference value; a roll rate of the tow truck exceeds a predetermined ninth reference value; or a roll rate of the trailer exceeds a predetermined tenth reference value, the predetermined reference condition may be preset to meet a condition to enter a dangerous stage; and when the entrance to the dangerous stage is performed, the controller may be configured to perform the stability control for the tow truck and the trailer.

The stability control of the tow truck may be performed by combining at least two of deceleration control, steering control, and partial braking control of the tow truck.

The stability control of the trailer may be performed through partial braking control of the trailer.

The trailer anti-sway system of the present disclosure predicts a situation in which the sway of a tow truck and a trailer is expected to occur, warns a driver of the situation, and effectively suppresses the occurrence of the sway, thereby further improving the driving stability of the tow truck and the trailer.

BRIEF DESCRIPTION OF THE DRAWINGS

Figure 13:
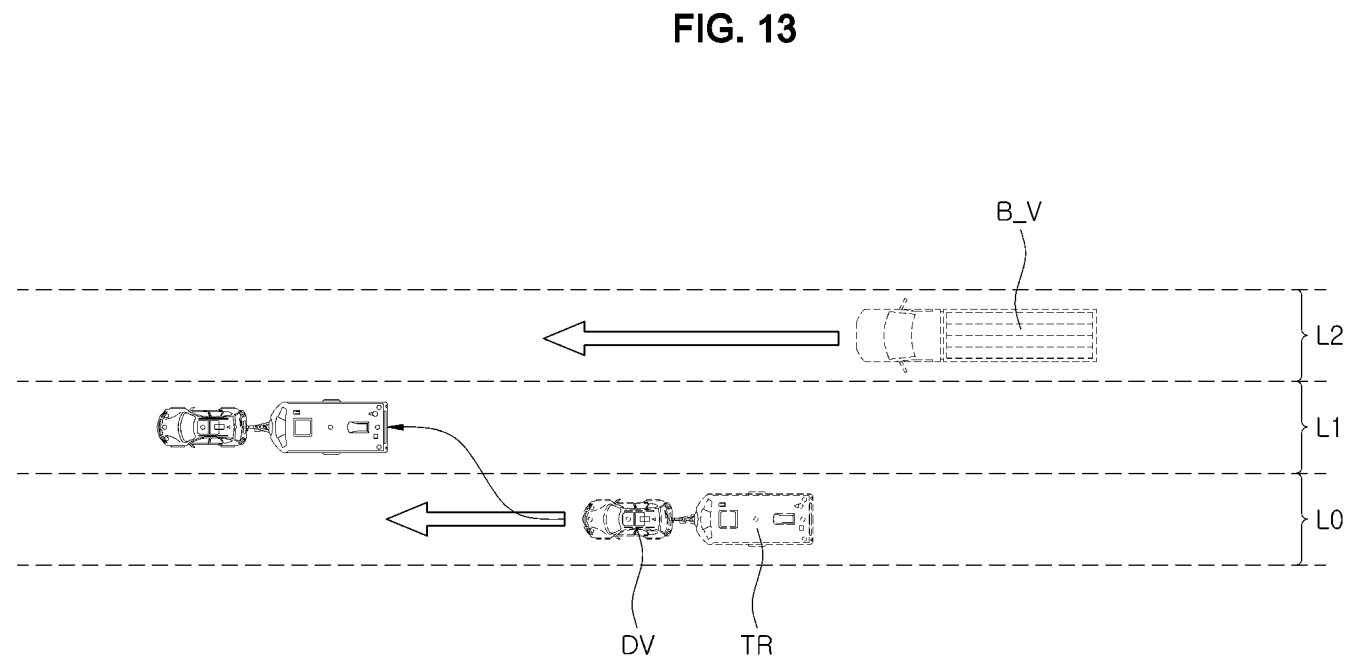

FIGS. 11 to 14 respectively are views illustrating a situation in which a large vehicle will pass in a lane on one side of the towing lane;

FIG. 18 is a view illustrating a strategy in which a controller performs division into a normal stage, a warning stage, and a dangerous stage according to a reference condition and responds to a sway phenomenon according to each stage.

DETAILED DESCRIPTION

Figure 1:
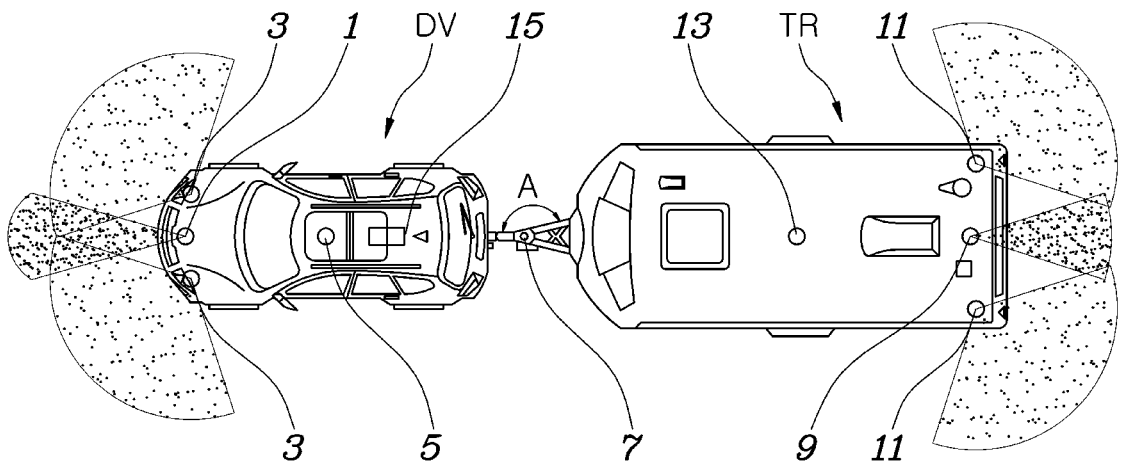
FIG. 1 is a view illustrating the configuration of a trailer anti-sway system according to the present disclosure.

Hereafter, an embodiment of the present disclosure will be described in detail with reference to the accompanying drawings and the same or similar components are given the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the embodiment described herein unclear, the detailed description is omitted. Further, the accompanying drawings are provided only for easy understanding of embodiment the disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Referring to FIG. 1, according to the embodiment of the present disclosure, a trailer anti-sway system includes: a front sensor installed on a front of a tow truck DV relative to the tow truck DV and a trailer TR; a tow truck inertial measurement unit (IMU) 5 mounted to the tow truck DV; a hinge angle sensor 7 configured to measure a hinge angle A between the tow truck DV and the trailer TR; a rear sensor installed on a rear of the trailer TR relative to the tow truck DV and the trailer TR; a trailer inertial measurement unit (IMU) 13 mounted to the trailer TR; and a controller 15 configured to receive a signal of at least one of a front camera 1, a front and side radar 3, the tow truck IMU 5, the hinge angle sensor 7, a rear camera 9, a rear and side radar 11, and a trailer IMU 13, predict a possibility of a sway occurrence to warn a driver of the possibility of the sway occurrence, and perform stability control for the tow truck DV and the trailer TR by stages according to a predetermined reference condition. In some implementations, the controller 15 may be a hardware device implemented by various electronic circuits (e.g., computer, microprocessor, CPU, ASIC, circuitry, logic circuits, etc.). The processor may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Here, the front sensor installed on the front of the tow truck DV relative to the tow truck DV and the trailer TR, for example, may include the front camera 1 which photographs the front side of the tow truck DV, and the front and side radar 3 which monitors the front and side of the tow truck DV.

In addition, for example, the rear sensor installed on the rear of the trailer TR relative to the tow truck DV and the trailer TR may include the rear camera 9 which photographs the rear side of the trailer TR, and the rear and side radar 11 which monitors the rear and side of the trailer TR.

That is, the controller 15 receives a signal from the front camera 1, the front and side radar 3, the tow truck IMU 5, the hinge angle sensor 7, the rear camera 9, the rear and side radar 11, and the trailer IMU, predicts whether there is the possibility of sway occurrence by analyzing the signal. When it is determined that there is the possibility of sway occurrence, the controller 15 warns a driver of this through at least one of visual or auditory methods and enables a driver to take measures in advance to prevent a sway occurrence. In some implementations, the tow truck IMU 5 and the trailer IMU may be a hardware device implemented by various electronic circuits (e.g., computer, microprocessor, CPU, ASIC, circuitry, logic circuits, etc.). The processor may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

In addition, when it is determined that the possibility of sway occurrence increases according to the reference condition, the controller 15 gradually performs the stability control of the tow truck DV and the trailer TR to actively prevent a sway phenomenon.

For reference, the hinge angle A between the tow truck DV and the trailer TR refers to a connection angle between the tow truck DV and the trailer TR in the top plan view of the tow truck DV and the trailer TR as illustrated in FIG. 1.

Meanwhile, in states in which the trailer TR is not connected to and is connected to the tow truck DV while the tow truck DV and the trailer TR are in stop states, the controller 15 may be configured to use a change of vanishing points of images captured by the front camera 1 to detect a pitch change of the tow truck DV and, when the pitch change of the tow truck DV exceeds a predetermined threshold and an alignment failure occurs, to warn a driver of the alignment failure so that the driver is induced to adjust a height of the tow truck DV or so that the height of the tow truck DV is automatically adjusted.

Figure 2:
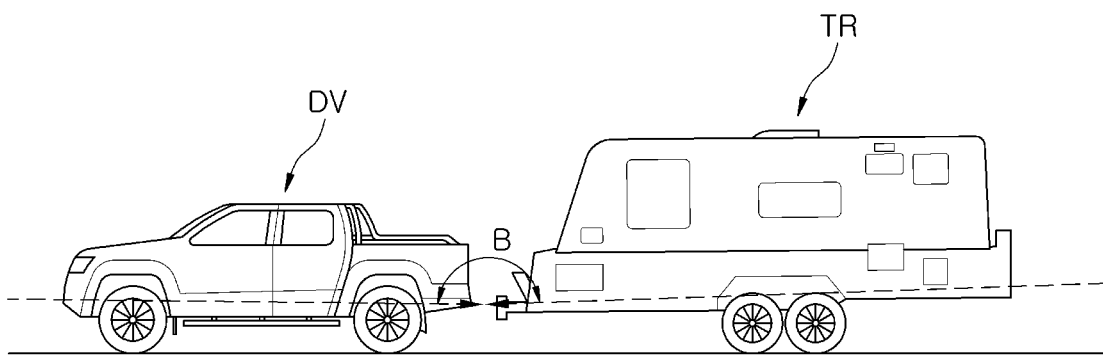
FIG. 2 is a view illustrating the aligning of a tow truck and the trailer.
Figure 3:
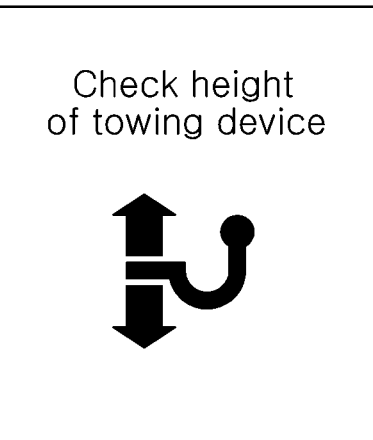
FIG. 3 is a view illustrating an example of displaying the informing of the preliminary inspection of a towing device on a dashboard when a tow truck is not equipped with a vehicle height adjustment device.

Here, it is determined whether the aligning of the tow truck DV and the trailer TR is good or bad depending on whether a connection angle B between the tow truck DV and the trailer TR is an appropriate level in the vertical section of the tow truck DV and the trailer TR as illustrated in FIG. 2. As illustrated in FIG. 2, when the connection angle between the tow truck DV and the trailer TR is within a predetermined range relative to 180 degrees, the aligning of the tow truck DV and the trailer TR may be considered good.

Accordingly, an alignment state between the tow truck DV and the trailer TR may be indirectly checked through the pitch angle of the tow truck DV, and when the alignment state between the tow truck DV and the trailer TR is not good, driving stability decreases, and this means that a controlling force over the tow truck DV and the trailer TR decreases, thereby being vulnerable to a sway phenomenon.

For example, when the tow truck DV drives while the rear of the tow truck DV is lifted by the trailer TR due to bad alignment of the tow truck DV and the trailer TR, the rear traction of the tow truck DV is decreased. Accordingly, even in the case of slight lateral external forces such as cross winds, the driving stability of the tow truck DV and the trailer TR is very easily decreased, which significantly increases the possibility of a sway occurrence.

Accordingly, the controller 15 of the present disclosure monitors the change of the pitch angle of the tow truck DV before and after the tow truck DV is connected to the trailer TR to indirectly determine whether the alignment state of the tow truck DV and the trailer TR is good or bad, and accordingly, adjusts the vehicle height of the tow truck DV so that the pitch change of the tow truck DV is within the threshold. Accordingly, the alignment state of the tow truck DV and the trailer TR can be indirectly adjusted to an appropriate level.

For example, when the tow truck DV is not equipped with a vehicle height adjustment device such as air suspension, the controller 15 may display a warning on a dashboard so that preliminary inspection and response to a towing device or the trailer TR can be performed before the driving of the tow truck DV.

Figure 4:
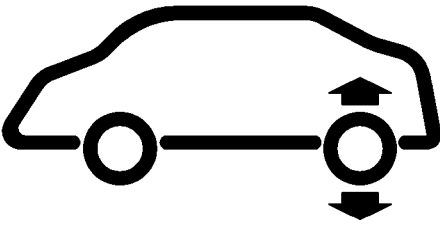
FIG. 4 is a view illustrating an example of inducing a driver to turn on a vehicle height adjustment function when a tow truck is equipped with a vehicle height adjustment device which requires manual adjustment.
Figure 5:
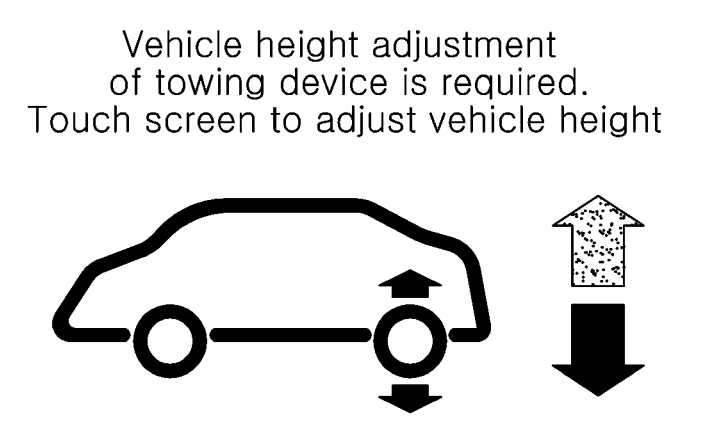
FIG. 5 is a view illustrating an example of receiving input from a driver to specifically induce vehicle height adjustment.
Figure 6:
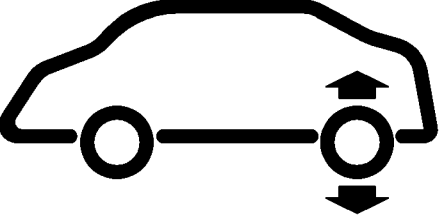
FIG. 6 is a view illustrating an example of informing of a situation in which vehicle height adjustment has been completed to an appropriate level by a driver's manipulation.

In addition, when the tow truck DV is equipped with the vehicle height adjustment device and the vehicle height adjustment device is required to be adjusted manually, the controller 15 may display a warning on the dashboard as illustrated in FIG. 4 to induce a driver to turn on a vehicle height adjustment function. Alternatively, the controller 15 may induce to adjust vehicle height by receiving specific input from a driver through a display as illustrated in FIG. 5, and may inform a driver through a display as illustrated in FIG. 6 when the vehicle height adjustment is completed to an appropriate level.

Figure 7:
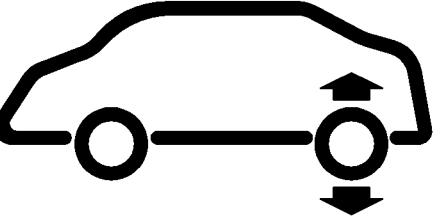
FIG. 7 is a view illustrating an example of inducing a driver to turn on an automatic vehicle height adjustment function when the tow truck is equipped with an automatic vehicle height adjustment device.
Figure 8:
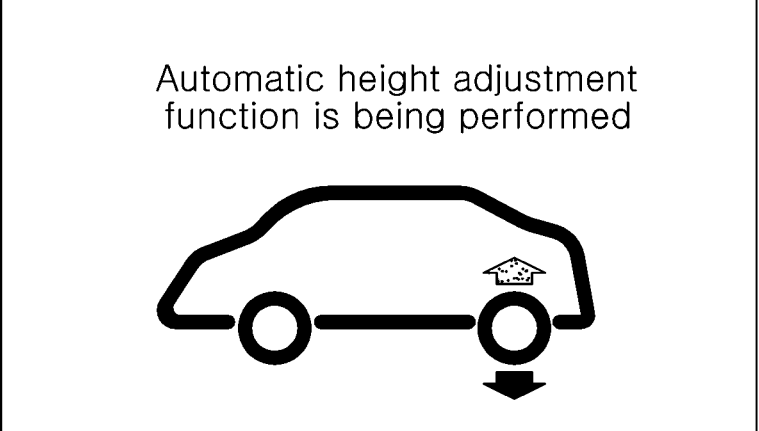
FIG. 8 is a view illustrating an example of informing of a state in which a vehicle height is automatically adjusted.
Figure 9:
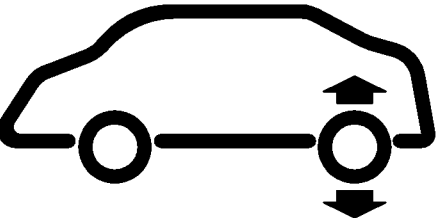
FIG. 9 is a view illustrating an example of informing of a situation in which vehicle height adjustment is automatically completed.
Figure 10:
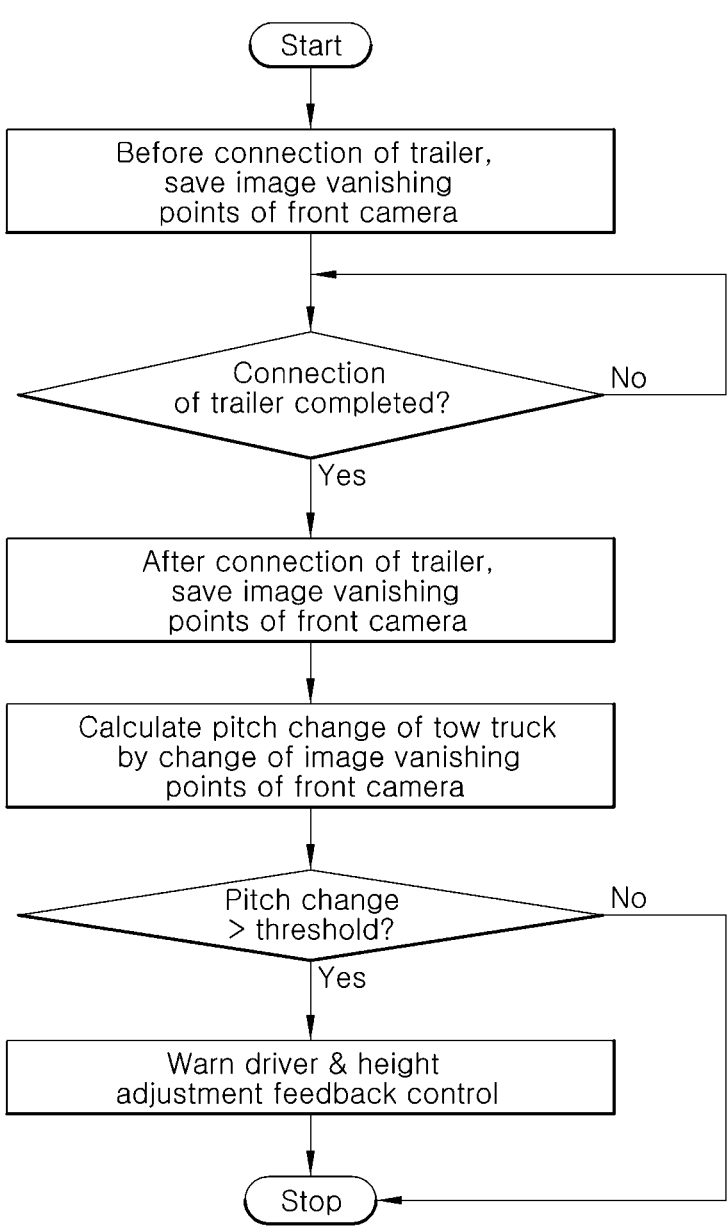
FIG. 10 is a flowchart illustrating an example of performing the vehicle height adjustment of the tow truck according to whether the change of the pitch angle of the tow truck exceeds a threshold before and after connecting the trailer to the tow truck in a vehicle equipped with the vehicle height adjustment device which can perform automatic vehicle height adjustment.

Alternatively, when the tow truck DV is equipped with a vehicle height adjustment device which can perform automatic vehicle height adjustment, the controller 15 may inform a driver to turn on an automatic vehicle height adjustment function through a display as illustrated in FIG. 7, may inform that the vehicle height adjustment function is being performed through a display as illustrated in FIG. 8, and may allow completion of the vehicle height adjustment to be informed as illustrated in FIG. 9 when the vehicle height adjustment is completed.

For reference, in a vehicle equipped with the vehicle height adjustment device capable of performing the automatic vehicle height adjustment as illustrated in FIGS. 7 to 9, FIG. 10 is a flowchart illustrating an example of performing the vehicle height adjustment of the tow truck DV according to whether the change of the pitch angle of the tow truck DV exceeds the threshold before and after connecting the trailer TR to the tow truck DV in a vehicle equipped with the vehicle height adjustment device.

Here, in accordance with the above-mentioned purpose, the threshold may be designed through multiple experiments and analyses to check that the alignment of the tow truck DV and the trailer TR is in a good state since the pitch change before and after the trailer TR is connected to the tow truck DV is not large.

When expecting a situation in which a large vehicle B_V will pass by the tow truck DV and the trailer TR in a lane at the first side of a towing lane L0, which is a lane in which the tow truck DV and the trailer TR are driving, the controller 15 is configured to predict that there is the possibility of the sway occurrence.

Figure 11:
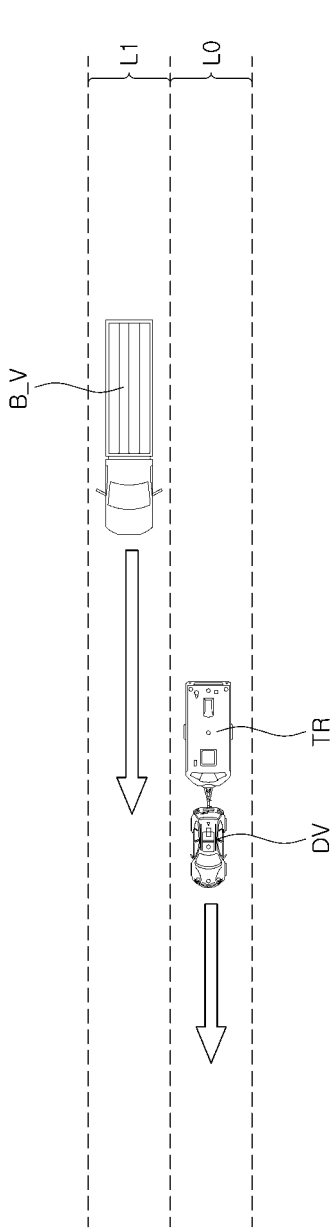

Here, the situation in which the large vehicle B_V will pass in the lane at the first side of the towing lane L0 may be a situation in which the vehicle speed of the large vehicle B_V driving on the rear side of the first side lane L1 at the first side of the towing lane L0 is faster than the vehicle speed of the tow truck DV and the trailer TR as illustrated in FIG. 11.

For reference, here, "the towing lane L0" refers to a lane in which the tow truck DV and the trailer TR are driving, and lanes located on a side relative to the towing lane L0 are sequentially called "the first side lane L1", "a second side lane L2", and "a third side lane L3".

In addition, here, a situation in which the large vehicle B_V passes in the side lane of the towing lane L0 includes a situation in which the tow truck DV and the trailer TR pass the large vehicle B_V, which is ahead, at faster speeds than the speed of the large vehicle B_V, and a converse situation in which the large vehicle B_V passes the tow truck DV and the trailer TR at a faster speed.

As described above, when the large vehicle B_V drives faster than the tow truck DV and the trailer TR on the rear side of the first side lane L1 at the first side of the towing lane L0, the large vehicle B_V may cause a sudden change in air flow while passing in the lane at the first side of the tow truck DV and the trailer TR. In this case, it is determined that there is the possibility of the sway occurrence of the tow truck DV and the trailer TR.

In a case in which it is determined that there is the possibility of the sway occurrence of the tow truck DV and the trailer TR, the controller 15 determines the case as a normal stage as illustrated in FIG. 18 and, as described above, warns a driver of the possibility of a sway occurrence through at least one of visual or auditory means so that a driver can prepare for the situation in advance.

For reference, in FIGS. 11 to 17, arrows marked in front of the vehicles indicate vehicle speeds, and as the lengths of the arrows increase, the vehicle speeds increase.

Figure 12:
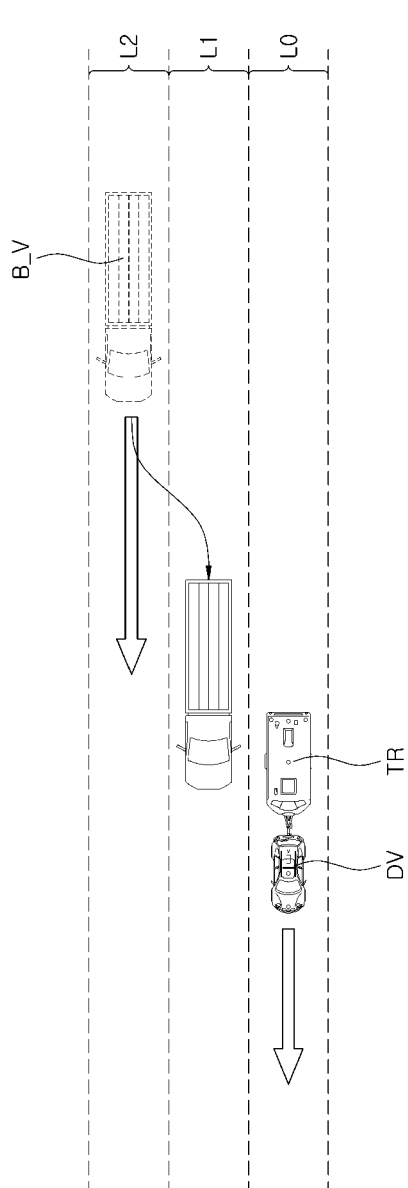
Figure 14:
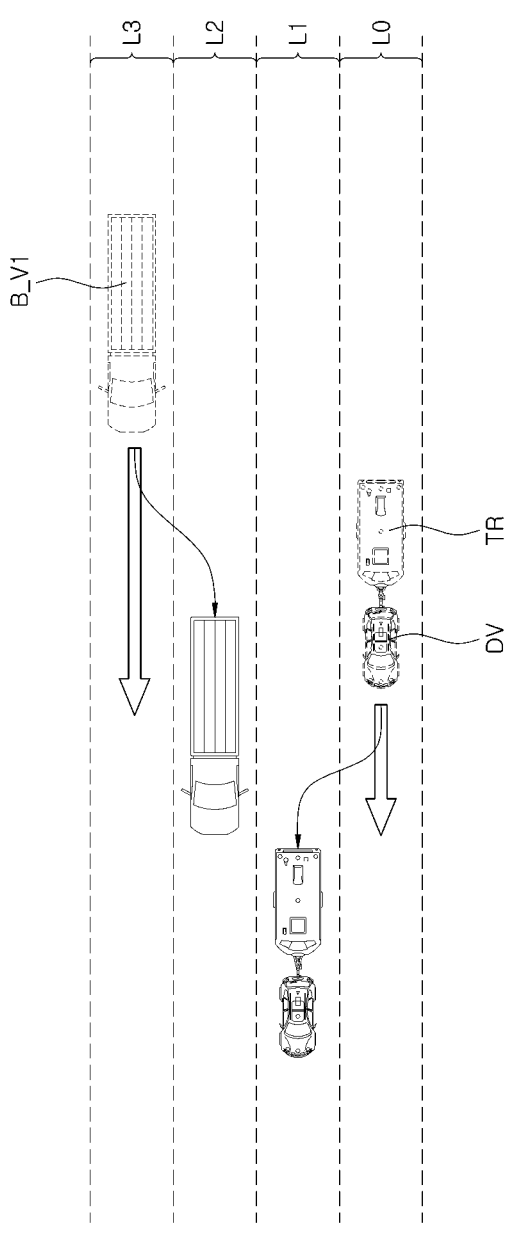

In addition, a situation in which the large vehicle B_V will pass in a lane at the first side of the towing lane L0 may include a situation in which the large vehicle B_V driving on a rear side of the second side lane at the first side of the towing lane L0 performs a lane change to the first side lane L1 at the first side of the towing lane L0 at a speed faster than the speeds of the tow truck DV and the trailer TR as illustrated in FIG. 12;

a situation in which the tow truck DV and the trailer TR perform a lane change to the first side lane L1 at the first side of the towing lane L0 when the large vehicle B_V is driving at a faster speed than the speeds of the tow truck DV and the trailer TR on the rear side of the second side lane at the first side of the towing lane L0 as illustrated in FIG. 13; and a situation in which the large vehicle B_V driving on the rear side of the third side lane at the first side of the towing lane L0 performs a lane change to the second side lane at the first side of the towing lane L0 at a faster speed than the speeds of the tow truck DV and the trailer TR, and the tow truck DV and the trailer TR perform a lane change to the first side lane L1 at the first side of the towing lane L0 as illustrated in FIG. 14.

Of course, even in the cases above, the controller 15 determines that there is the possibility of the sway occurrence of the tow truck DV and the trailer TR, recognizes the cases as the normal stage, and warns a driver of the possibility of the sway occurrence.

In addition, even when expecting a situation in which a first large vehicle B_V1 and a second large vehicle B_V2 respectively will pass by the tow truck DV and the trailer TR in lanes at opposite sides of the towing lane L0, which are lanes in which the tow truck DV and the trailer TR are driving, the controller 15 is configured to predict that there is the possibility of the sway occurrence.

Here, the situation in which the first large vehicle B_V1 and the second large vehicle B_V2 will pass in the lanes at opposite sides of the towing lane L0 includes the first large vehicle B_V1 and the second large vehicle B_V2 in the opposite side lanes simultaneously overtake the tow truck DV and the trailer TR from the rear sides of the opposite side lanes, and a converse situation in which the tow truck DV and the trailer TR overtakes the first large vehicle B_V1 and the second large vehicle B_V2 driving in the opposite side lanes from the rear side of the towing lane L0.

That is, the situations in which the large vehicles B_V pass in the lanes at the opposite sides of the tow truck DV and the trailer TR may cause a sudden change in air flow, and thus the possibility of the sway occurrence of the tow truck DV and the trailer TR is high. In this case, it is determined that there is the possibility of the sway occurrence, and thus a driver is warned of the possibility of the sway occurrence.

Figure 15:
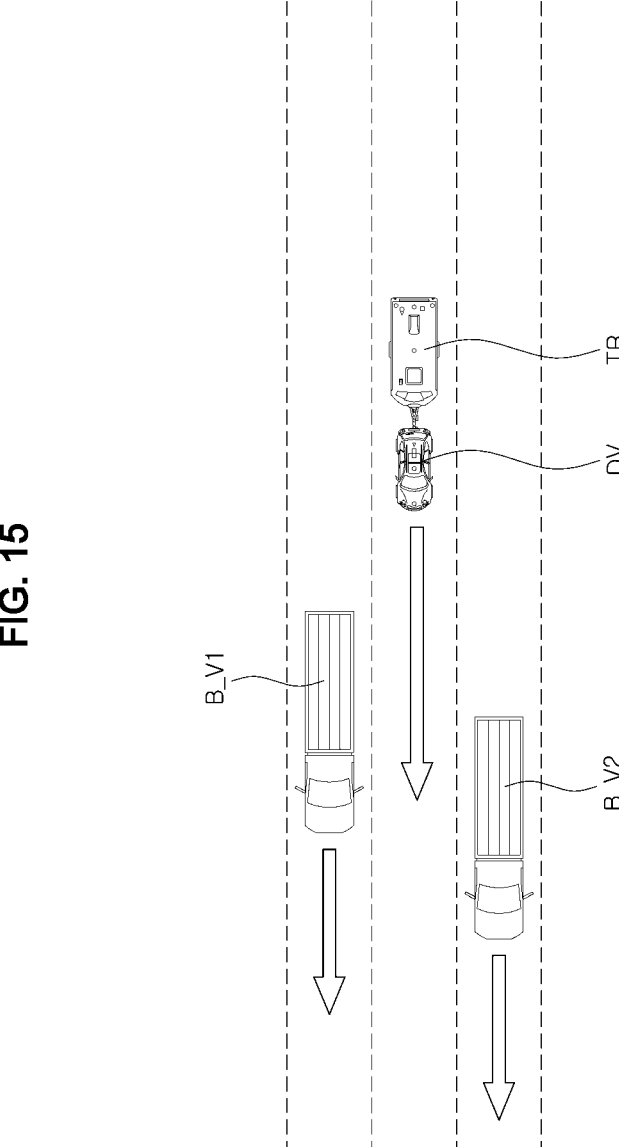
FIGS. 15 to 17 respectively are views illustrating a situation in which a first large vehicle and a second large vehicle will pass in lanes on opposite sides of the towing lane.
Figure 16:
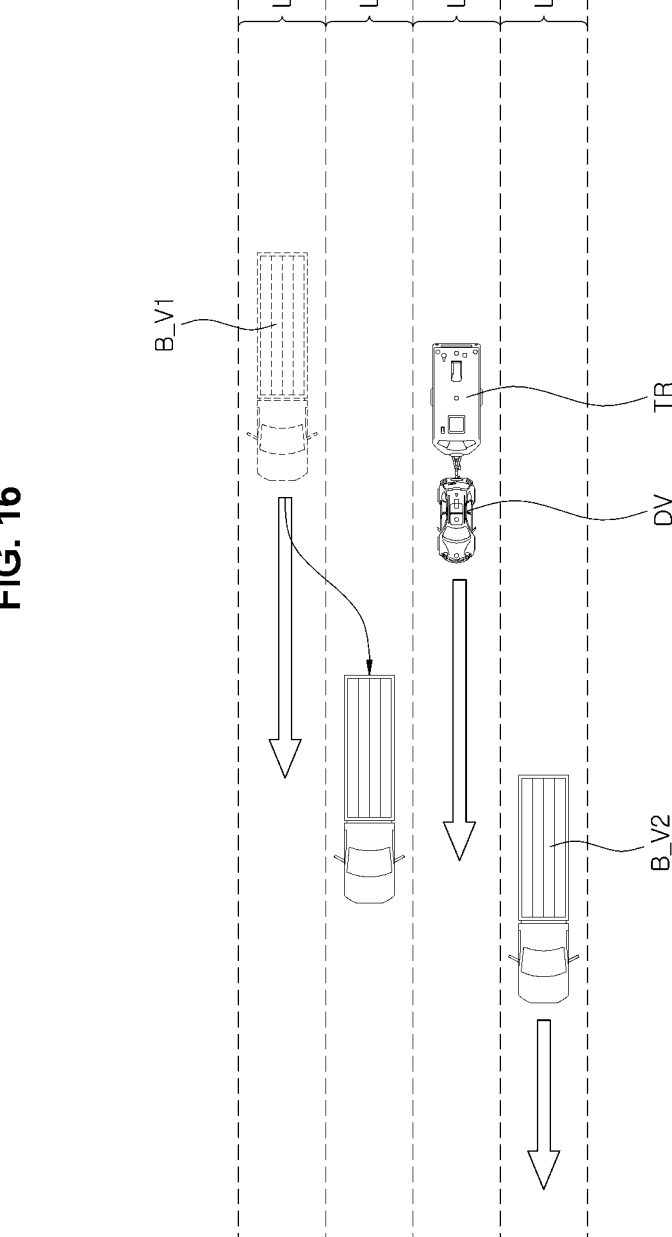
Figure 17:
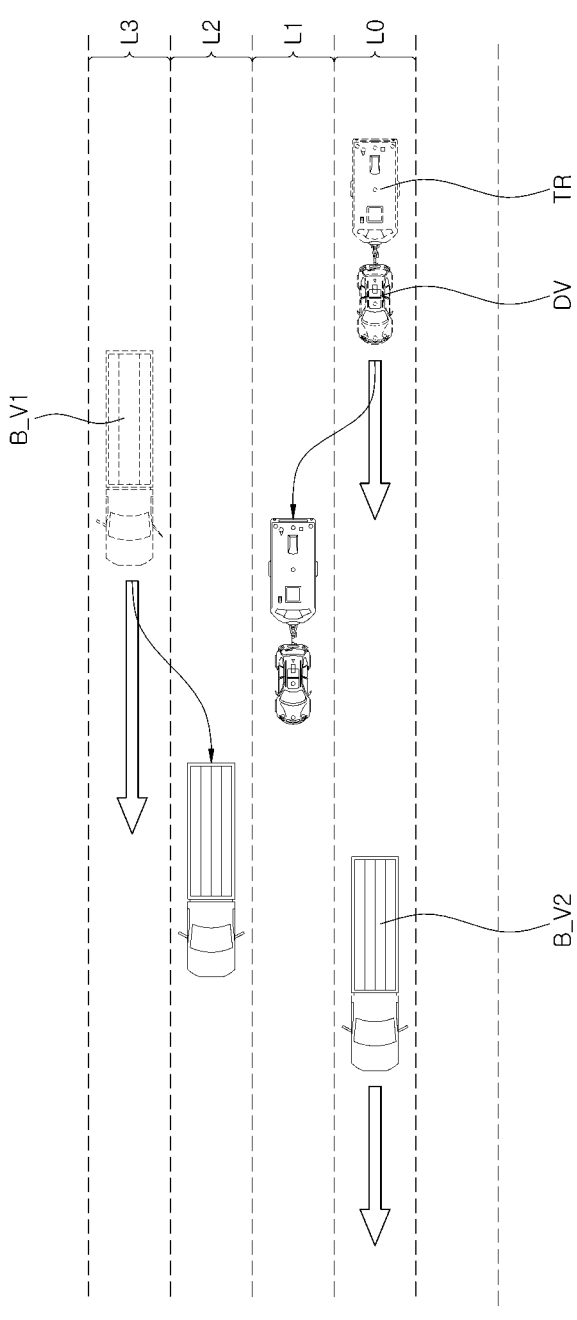

Here, the situation in which the first large vehicle B_V1 and the second large vehicle B_V2 will pass in the lanes at the opposite sides of the towing lane L0 includes: a situation in which speeds of the tow truck DV and the trailer TR are faster than speeds of the first large vehicle B_V1 and the second large vehicle B_V2 driving side by side at front sides of first side lanes L1 at the opposite sides of the towing lane L0 as illustrated in FIG. 15;

a situation in which the first large vehicle B_V1, which is driving alongside the tow truck DV and the trailer TR, in the second side lane at the first side of the towing lane L0 performs a lane change to a first side lane L1 at the first side of the towing lane L0, and speeds of the tow truck DV and the trailer TR are faster than the speed of the second large vehicle B_V2 driving at the front side of a first side lane L1 at a second side of the towing lane L0 as illustrated in FIG. 16; and a situation in which the tow truck DV and the trailer TR perform a lane change to the first side lane L1 at the first side of the towing lane L0 at a faster speed than the speed of the second large vehicle B_V2 driving at the front side of the towing lane L0, and the first large vehicle B_V1, which is driving alongside the tow truck DV and the trailer TR, in the third side lane at the first side of the towing lane L0 performs a lane change to a second side lane at the first side of the towing lane L0 as illustrated in FIG. 17.

As described above, when expecting the situation in which the first large vehicle B_V1 and the second large vehicle B_V2 will pass in the lanes at the opposite sides of the towing lane L0, the controller 15 predicts that there is the possibility of the sway occurrence, and warns a driver of the possibility of the sway occurrence as the normal stage so that the driver can prepare for the situation in advance.

Meanwhile, referring to FIG. 18, when the hinge angle exceeds a predetermined first reference value; a hinge angular speed exceeds a predetermined second reference value; a yaw rate of the tow truck DV exceeds a predetermined third reference value; and a yaw rate of the trailer TR exceeds a predetermined fourth reference value, the predetermined reference condition may be preset to meet a condition to enter a warning stage.

When the entrance to the warning stage is performed, the controller 15 is configured to perform stability control for only the tow truck DV.

Here, the stability control of the tow truck DV may be performed by combining at least two of deceleration control, steering control, and partial braking control of the tow truck DV.

That is, the controller 15 suppresses a sway occurrence by decelerating or steering the tow truck DV, or partially braking wheels of any one side of opposite sides.

Of course, for such control, the controller 15 is configured to be connected to the brake device and steering device of the tow truck DV and to actively control the brake device and steering device.

The hinge angle, the hinge angular speed, the yaw rate of the tow truck DV, and the yaw rate of the trailer TR are all physical quantities that can indicate that the degree of sway phenomenon increases as the sizes of the hinge angle, the hinge angular speed, the yaw rate of the tow truck DV, and the yaw rate of the trailer TR increase. Accordingly, when these physical quantities are equal to or greater than a predetermined level, the development of the sway phenomenon is suppressed through the stability control of the tow truck DV as described above.

Accordingly, the first reference value, the second reference value, the third reference value, and the fourth reference value are preset at levels to determine whether the sway phenomenon of the tow truck DV and the trailer TR is required to be suppressed through the stability control of the tow truck DV according to the above-mentioned purpose. The first reference value, the second reference value, the third reference value, and the fourth reference value may be determined by design according to the specifications of the tow truck DV and the trailer TR through multiple experiments and analyses.

In addition, in the situation in which the condition to enter the warning stage is met, when the hinge angle exceeds a predetermined fifth reference value greater than the first reference value; the hinge angular speed exceeds a predetermined sixth reference value greater than the second reference value; the yaw rate of the tow truck DV exceeds a predetermined seventh reference value greater than the third reference value; the yaw rate of the trailer TR exceeds a predetermined eighth reference value greater than the fourth reference value; a roll rate of the tow truck DV exceeds a predetermined ninth reference value; or a roll rate of the trailer TR exceeds a predetermined tenth reference value, the predetermined reference condition may be preset to meet a condition to enter a dangerous stage.

In addition, when the entrance to the dangerous stage is performed, the controller 15 is configured to perform the stability control for the tow truck DV and the trailer TR.

The stability control of the trailer TR may be performed through the partial braking control of the trailer TR.

Accordingly, the controller 15 is connected to the braking device of the trailer TR to control the braking device of the trailer TR. As described above, when the entrance to the dangerous stage is performed, the controller 15 performs the stability control for both the tow truck DV and the trailer TR so that a sway phenomenon is suppressed as much as possible.

Here, the fifth reference value, the sixth reference value, the seventh reference value, and the eighth reference value are respectively greater than the first reference value, the second reference value, the third reference value, and the fourth reference value, and are preset to determine a situation in which due to further increase of one of corresponding physical quantities, the stability control of the tow truck DV alone is no longer sufficient to suppress a sway phenomenon and the stability control of the trailer TR is also required to be performed. The fifth reference value, the sixth reference value, the seventh reference value, and the eighth reference value may be determined by design through multiple experiments and analyses.

In addition, when the roll rate of the tow truck DV or the roll rate of the trailer TR exceeds a predetermined level, a sway phenomenon is severe, and the stability control of the tow truck DV alone cannot sufficiently suppress the sway phenomenon. Accordingly, the above situation may be determined as a situation in which the stability control of the trailer TR is required to be added to suppress the way phenomenon as much as possible.

Accordingly, in accordance with the above-mentioned purpose, the ninth reference value or the tenth reference value is preset to determine whether the stability control of the trailer TR is required to be added to suppress a sway phenomenon as much as possible since the sway phenomenon cannot be sufficiently suppressed by the stability control of the tow truck DV alone, and may also be determined by design through multiple experiments and analyses.

Although the present disclosure was provided above in relation to specific embodiment shown in the drawings, it is apparent to those skilled in the art that the present disclosure may be changed and modified in various ways without departing from the scope of the present disclosure, which is described in the following claims.

The invention claimed is:

1. A trailer anti-sway system comprising:
a front sensor installed on a front of a tow truck relative to the tow truck and a trailer;
a tow truck inertial measurement unit (IMU) mounted to the tow truck;
a hinge angle sensor configured to measure a hinge angle between the tow truck and the trailer;
a rear sensor installed on a rear of the trailer relative to the tow truck and the trailer;
a trailer IMU mounted to the trailer; and
a controller configured to receive a signal from one or more selected from the front sensor, the tow truck IMU, the hinge angle sensor, the rear sensor, and the trailer IMU, predict a possibility of a sway occurrence to warn a driver of the possibility of the sway occurrence based on the received signal, and perform stability control for one or more of the tow truck and the trailer by a stage based on a predetermined reference condition, wherein, while the tow truck and the trailer are in stop states, the controller is configured to:

save first vanishing points of images captured by a front camera before the trailer is connected to the tow truck;

save second vanishing points of images captured by the front camera after the trailer is connected to the tow truck;

calculate a pitch change of the tow truck based on a change between the first vanishing points and the second vanishing points;

determine that an alignment failure between the tow truck and the trailer occurs when the pitch change exceeds a predetermined threshold; and warn a driver of the alignment failure so that a height of the tow truck is manually or automatically adjusted.

2. The system of claim 1, wherein the controller is configured to predict the possibility of the sway occurrence by predicting a situation in which a large vehicle will pass by the tow truck and the trailer in a lane at a first side of a towing lane, which is a lane in which the tow truck and the trailer are driving based on the received signal.

3. The system of claim 2, wherein the situation in which the large vehicle will pass in the lane at the first side of the towing lane comprises one or more selected from a situation in which a speed of the large vehicle driving on a rear side of a first side lane at the first side of the towing lane is faster than speeds of the tow truck and the trailer, a situation in which the large vehicle driving on a rear side of a second side lane at the first side of the towing lane performs a lane change to the first side lane at the first side of the towing lane at a faster speed than speeds of the tow truck and the trailer, a situation in which the tow truck and the trailer perform a lane change to the first side lane at the first side of the towing lane when the large vehicle on the rear side of the second side lane at the first side of the towing lane is driving at a faster speed than speeds of the tow truck and the trailer and a situation in which the large vehicle driving at a rear side of a third side lane at the first side of the towing lane performs a lane change to the second side lane at the first side of the towing lane at a faster speed than speeds of the tow truck and the trailer, and the tow truck and the trailer perform a lane change to the first side lane at the first side of the towing lane.

4. The system of claim 1, wherein the controller is configured to predict the possibility of the sway occurrence by predicting a situation in which a first large vehicle and a second large vehicle respectively will pass by the tow truck and the trailer in lanes at opposite sides of a towing lane, which is a lane in which the tow truck and the trailer are driving based on the received signal.

5. The system of claim 4, wherein the situation in which the first large vehicle and the second large vehicle respectively will pass in the lanes at the opposite sides of the towing lane comprises one or more selected from a situation in which speeds of the tow truck and the trailer are faster than speeds of the first large vehicle and the second large vehicle respectively driving side by side at front sides of first side lanes at the opposite sides of the towing lane, a situation in which the first large vehicle, which is driving alongside the tow truck and the trailer, in a second side lane at a first side of the towing lane performs a lane change to a first side lane at the first side of the towing lane, and speeds of the tow truck and the trailer are faster than a speed of the second large vehicle driving at a front side of a first side lane at a second side of the towing lane and a situation in which the tow truck and the trailer perform a lane change to a first side lane at the first side of the towing lane at a faster speed than the speed of the second large vehicle driving at a front side of the towing lane, and the first large vehicle, which is driving alongside the tow truck and the trailer, in a third side lane at the first side of the towing lane performs a lane change to a second side lane at the first side of the towing lane.

6. The system of claim 1, wherein the controller is configured to determine whether the predetermined reference condition meets first conditions including:

a condition that the hinge angle exceeds a predetermined first reference value, a hinge angular speed exceeds a predetermined second reference value, a condition that a yaw rate of the tow truck exceeds a predetermined third reference value and a condition that a yaw rate of the trailer exceeds a predetermined fourth reference value, in response to a determination that the predetermined reference condition meets the first conditions, the controller is configured to determine that the stage is a warning stage and perform the stability control for only the tow truck.

7. The system of claim 6, wherein in response to a determination that the stage is a warning stage, the controller is further configured to determine whether the predetermined reference condition meets one or more second conditions selected from:

a condition that the hinge angle exceeds a predetermined fifth reference value greater than the first reference value, a condition that the hinge angular speed exceeds a predetermined sixth reference value greater than the second reference value, a condition that the yaw rate of the tow truck exceeds a predetermined seventh reference value greater than the third reference value, a condition that the yaw rate of the trailer exceeds a predetermined eighth reference value greater than the fourth reference value, a condition that a roll rate of the tow truck exceeds a predetermined ninth reference value, and a condition that a roll rate of the trailer exceeds a predetermined tenth reference value, in response to a determination that the predetermined reference condition meets the one or more second conditions, the controller is configured to determine that the stage is a dangerous stage and perform the stability control for the tow truck and the trailer.

8. The system of claim 7, wherein the stability control of the tow truck is performed by combining one or more of deceleration control, steering control, and partial braking control of the tow truck.

9. The system of claim 7, wherein the stability control of the trailer is performed by partial braking control of the trailer.

* * * * *